United States Patent [19]
Geist

[11] Patent Number: 5,638,190
[45] Date of Patent: Jun. 10, 1997

[54] CONTEXT SENSITIVE COLOR QUANTIZATION SYSTEM AND METHOD

[75] Inventor: Robert M. Geist, Clemson, S.C.

[73] Assignee: Clemson University, Clemson, S.C.

[21] Appl. No.: 219,499

[22] Filed: Mar. 29, 1994

[51] Int. Cl.$^6$ .................................. G03F 3/08; H04N 1/46
[52] U.S. Cl. .......................... 358/500; 358/518; 358/519; 358/520; 358/521; 358/523; 358/535; 358/536; 358/534
[58] Field of Search .................................... 358/534, 535, 358/536, 523, 522, 521, 520, 519, 518; 395/22

[56] References Cited

U.S. PATENT DOCUMENTS

| | | |
|---|---|---|
| 4,675,750 | 6/1987 | Collins et al. . |
| 4,710,806 | 12/1987 | Iwai et al. . |
| 4,907,075 | 3/1990 | Braudaway . |
| 4,926,250 | 5/1990 | Konishi . |
| 4,994,927 | 2/1991 | Dixit et al. . |
| 4,998,165 | 3/1991 | Lindstrom . |
| 5,048,095 | 9/1991 | Bhanu et al. . |
| 5,119,186 | 6/1992 | Deacon .................................. 358/524 |
| 5,343,311 | 8/1994 | Morag .................................. 358/523 |

OTHER PUBLICATIONS

P. Burger and D. Gillies, Interactive Computer Graphics, 342–46 (1989).
M. Gervautz and W. Purgathofer, "A Simple Method for Color Quantization: Octree Quantization," Proc. of Computer Graphics International 1988, pp. 219–231, May 1988.
E. Fiume & M. Ouellette, "On Distributed, Probablistic Algorithms for Computer Graphics," Proc. Graphics Interface '89, pp. 211–218 (1989).
R. Balasubramanian and J. Allebach, "A New Approach to Palette Selection for Color Images," *Journal of Imaging Tech.*, vol. 17, No. 6, pp. 284–290 Dec. 1991.

*Primary Examiner*—Edward L. Coles, Sr.
*Assistant Examiner*—Tia M. Harris
*Attorney, Agent, or Firm*—Dority & Manning

[57] ABSTRACT

A system and method usable in producing a display image limited to a lesser number of colors from an input image having a greater number of colors. The invention is particularly useful in a computer system utilizing a video monitor capable of simultaneously displaying a selected number of colors stored in a lookup table. The system and method receive data representative of respective colors at a multiplicity of individual pixels in the input image. This input image data is then temporarily stored in an input buffer. An appropriate processor receives the input image data and performs image quantization thereon. Specifically, the processor first determines the selected colors to be included in the display image. Next, the processor determines which of the selected colors respectively correspond to individual pixels of the display image. Unlike the prior art, image quantization algorithms of the present invention selectively account for perceptive blending of colors appearing in the input image in determining the optimum display image. In other words, if individual colors appear in the input image in such a manner that a viewer would perceive a blended color, the invention will tend to display the blended color rather than the individual colors.

12 Claims, 5 Drawing Sheets

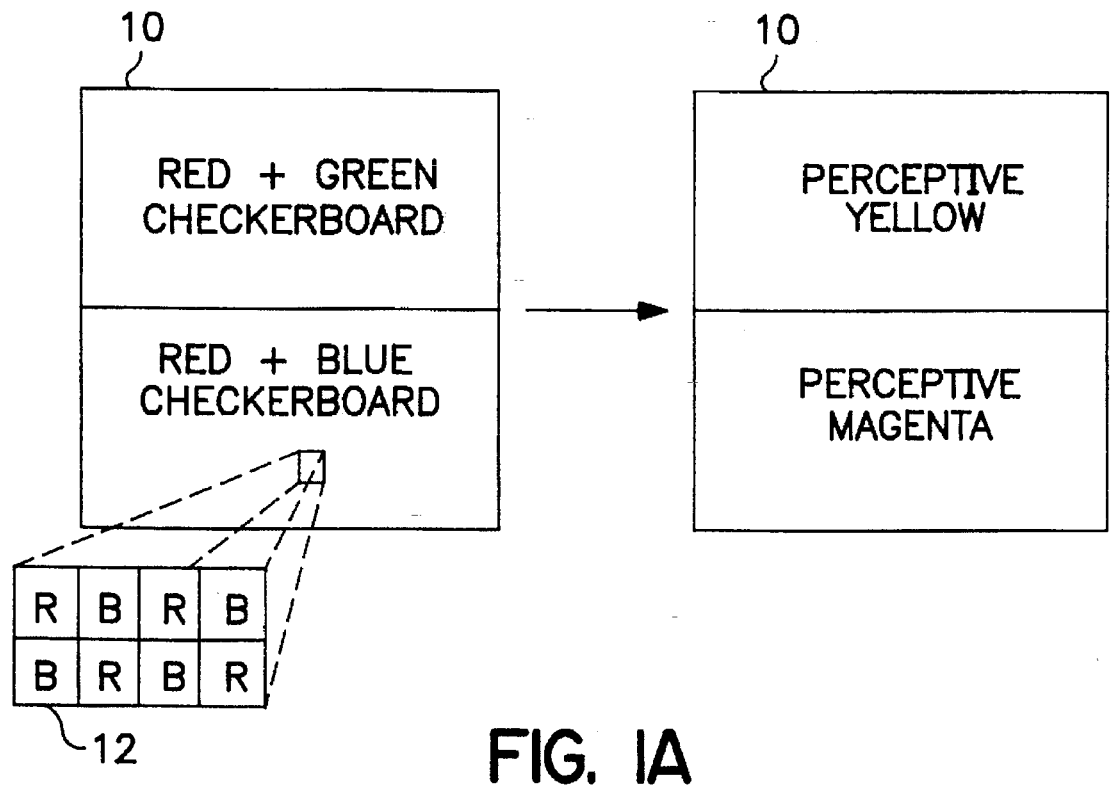
FIG. IA
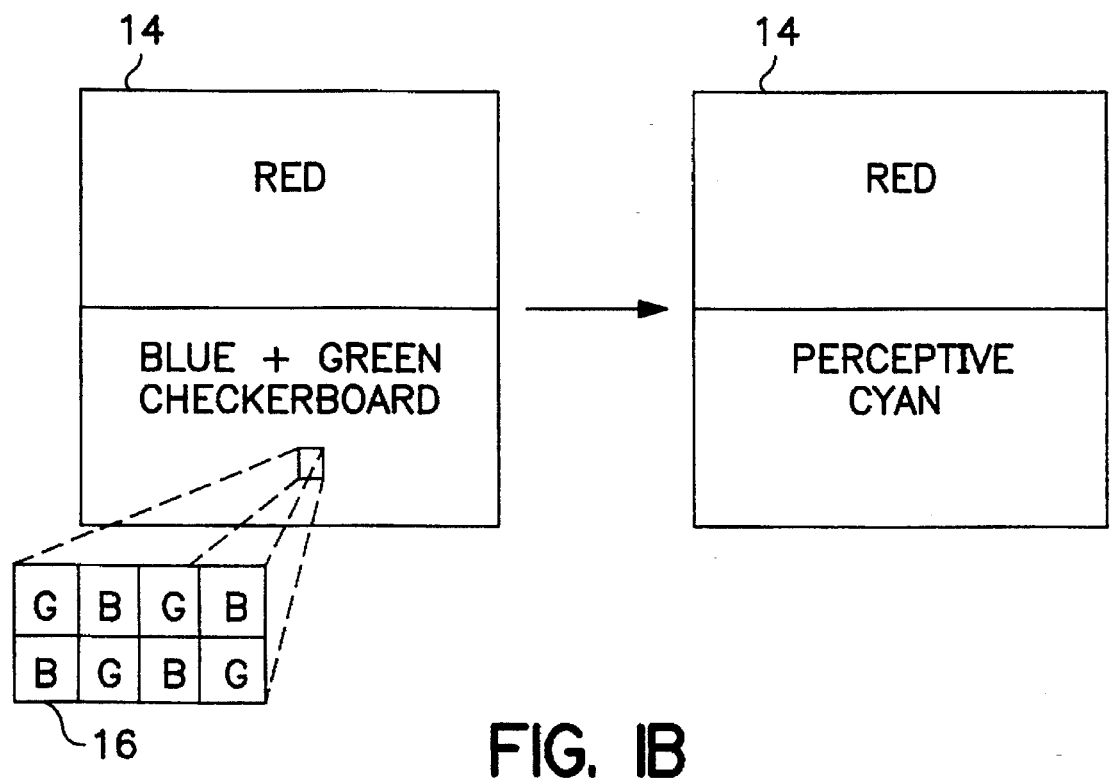
FIG. IB

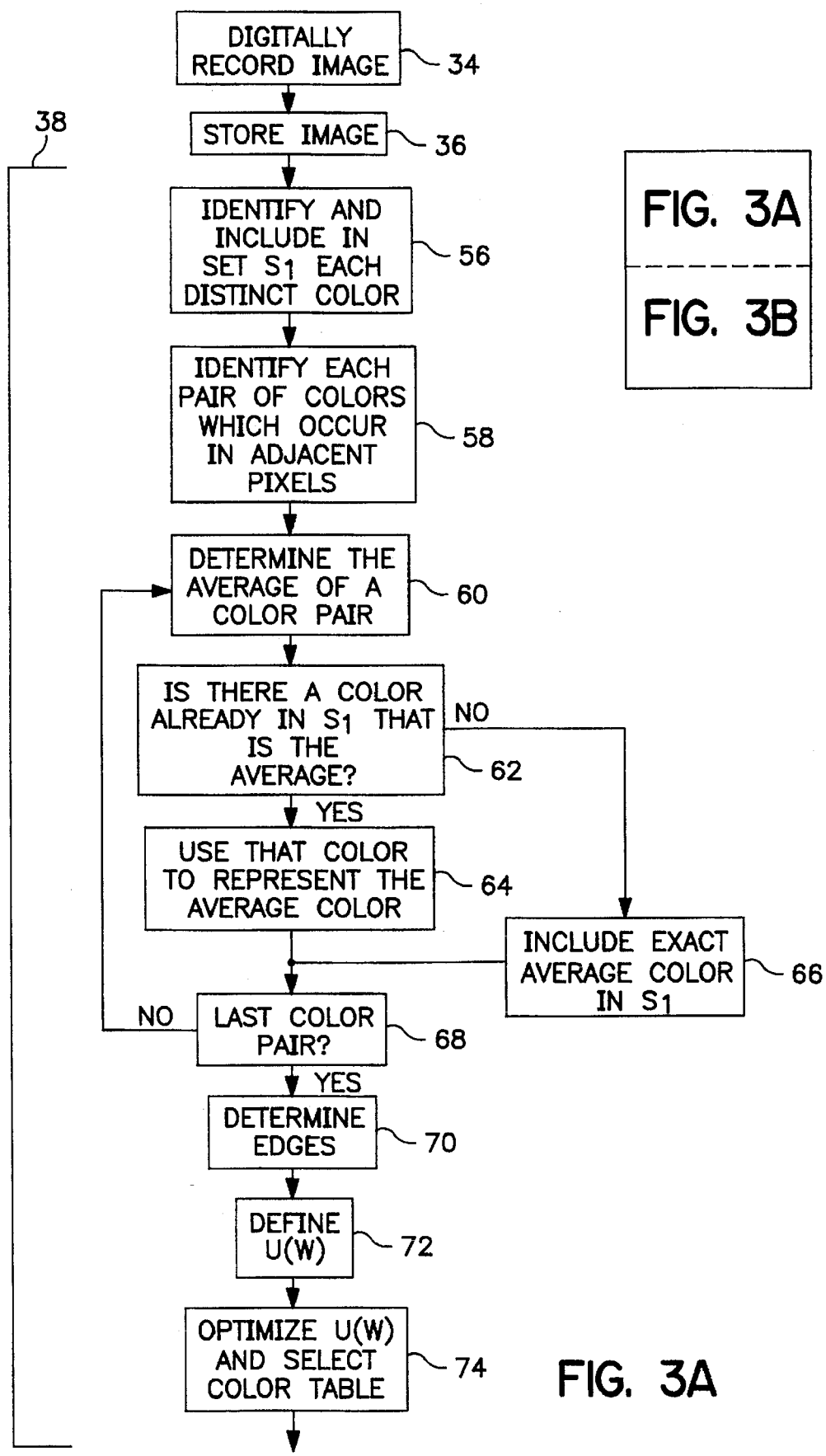

CONTEXT SENSITIVE COLOR QUANTIZATION SYSTEM AND METHOD

BACKGROUND OF THE INVENTION

The present invention relates generally to digital display systems. More particularly, the present invention relates to systems and methods for color quantization, i.e., producing a display image having a fewer number of colors from an original image having a greater number of colors.

A particular color may be defined by the relative intensities of certain primary colors making up that color. As such, the color may be thought of as a point in multidimensional space, the axes of which represent the individual primary colors. For example, the primary colors red, green and blue may define a three-dimensional space having coordinates R, G and B ("RGB space").

Digital image recording devices can record images containing millions of different colors. Typically, the image is recorded as a multiplicity of adjacent "pixels," i.e., picture elements. Each pixel contains a color, which is often represented by a 24-bit digital number. The 24-bit digital number is generally divided into three 8-bit segments which represent the respective coordinates along the three axes of the RGB color space. In this case, an individual pixel of an original recorded image may contain any one from a possible $2^{24}$ (16,777,216) colors.

If a 24-bit color monitor is used to reproduce the original image, a display image equivalent to the original image is easily obtained. However, monitors of this type are often prohibitively expensive. As such, most color monitors in use today store colors in a lookup table having respective memory locations addressed by an 8-bit index. Therefore, such monitors can simultaneously display at most $2^8$ (256) different colors. This lookup table may be referred to, along with the collection of colors therein, as a "color table."

The problem of displaying a color image defined by n bits per pixel on a device that is restricted, via a lookup table, to a total number of colors indexed by m bits (where m<n) is referred to as "color quantization." Color quantization encompasses the following two functions: (1) color selection, i.e., determining the smaller number of colors that will be used in the display image; and (2) color mapping, i.e., once the smaller number of colors are chosen, determining how these colors are to be distributed among the individual pixels of a display image.

A number of color quantization methods have been utilized in the past and are disclosed in the relevant literature. One such technique is referred to as the "uniform" method. The "uniform" method simply determines each color table entry by its index. Specifically, the color table index is divided into three bit fields corresponding to the primary color components of the color table entry. In the case of an 8-bit index (0–255), a common choice of field sizes is three bits for red, three bits for green, and two bits for blue (reflecting the relative insensitivity of the human eye to variations in blue). Such a choice therefore gives an index range of "0" to "7" for red and green, and "0" to "3" for blue. The actual color table entries are then determined by appropriate scaling of the index. For example, if each entry of the lookup table can store a 24-bit digital number, the respective colors may be determined by scaling the red and green fields by thirty-two (32) and the blue field by sixty-four (64).

Color table entries are mapped to individual pixels of the display image based on the color appearing in corresponding pixels of the original image. Specifically, the original image color is divided and truncated to produce an index value. In the above exemplar, this may be accomplished by dividing red and green components of the original image color by thirty-two (32) and the blue component by sixty-four (64). The remainders are dropped to give the respective red, green and blue bit fields of the chosen index. This index identifies the color table entry that will be used for the respective pixel.

A second color quantization method is the "popularity" method. The "popularity" method chooses the colors appearing most frequently in the original image as the respective color table entries. For example, the 256 most popular colors of the original image would be entered into a color table indexed by an 8-bit word. Colors in the original image may then be mapped to the color table entries by finding the entry which is closest in the multidimensional color space. This closest color may then be displayed in the corresponding pixel of the display image. The uniform method and the popularity method are discussed in P. Burger and D. Gillies, *Interactive Computer Graphics* (1989).

Another color quantization method is the "median-cut" method. Systems utilizing this technique assign a weight to each color used in the original image based on the number of times it is used. The multidimensional color space is then divided into boxes such that the sum of the weights of the colors in each box is approximately equal. The color table entries are determined by taking the weighted average of the image colors contained in each of the boxes. The average color for a particular box will be used to represent any color in the original image which falls within that box.

A discussion of the median cut quantization method may be found in P. Heckbert, "Colour Image Quantization for Frame Buffer Display", *ACM Computer Graphics*, Vol. 16, pp. 297–307, 1982. In this reference, the author notes that the median cut quantization method is likely to introduce objectionable color bands in large, smoothly shaded areas. To ameliorate this condition, the author suggests that a dithering technique be employed. This dithering technique is a variation on a known error diffusion algorithm, in which quantization error introduced at each pixel is distributed to its neighbors whose color assignments have not been made. Color banding, which would otherwise appear in the display image, is somewhat reduced by this dithering technique.

An additional color quantization method is referred to as "octree quantization." Like the median-cut method, this method divides the multidimensional color space and assigns weights to the colors in the original image. Octree quantization, however, adopts an approach of regular subdivision. Colors occurring in the original image which are close together in the color space are grouped together and averaged by weight. Grouping continues until all colors in the original image have been grouped and the number of groups is equal to the number of desired color table entries. Mapping is accomplished by using the representative color for every image color which falls in the group. This technique is disclosed in M. Gervautz and W. Purgathofer, "A Simple Method for Color Quantization: Octree Quantization," *Proc. of Computer Graphics International* 1988, pp. 219–31, May 1988.

A color quantization technique based on the notion of "simulated annealing" has been proposed in E. Fiume & M. Ouellette, "On Distributed, Probabilistic Algorithms for Computer Graphics", *Proc. Graphics Interface '89*, pp. 211–18 (1989). The simulated annealing technique can be described as a non-deterministic walk on an energy surface that is changing shape under the control of a "cooling" schedule. The energy of a particular color table may be defined as the sum of the quantization error introduced at each pixel by the use of that color table. A particular color table is selected by a gradient descent algorithm that occasionally accepts small ascending moves. Original image pixels are then mapped to the table entries which are closest thereto in the multidimensional color space.

Devices and systems are known in the art for recording and reproducing images and are disclosed in various prior art patents. For example, U.S. Pat. No. 4,907,075 to Braudaway discloses a histogram-based color selection method. U.S. Pat. No. 4,926,250 to Konishi discloses a color image recording and reproducing apparatus. This device reproduces color based on a histogram approach. U.S. Pat. No. 4,710,806 to Iwai discloses a digital display system with color lookup table. This system also uses a histogram approach to select the entries to be included in the color lookup table. Other patents of interest include U.S. Pat. No. 4,994,927 to Dixit, U.S Pat. No. 4,675,750 to Collins, and U.S. Pat. No. 4,998,165 to Lindstrom.

It can thus be seen that conventional schemes generally resolve the problem of color quantization using variations of a histogram approach. Histogram methods, however, will often fail to select the optimal colors for the color table because they focus on the colors appearing in individual pixels rather than colors which may appear in the image as a whole. For example, distinct colors may be used often in the original image, yet presented in adjacent pixels in a checkerboard arrangement. Due to spatial color integration, a blended color, rather than the distinct colors of the respective pixels, will be seen by the human eye. A histogram approach, however, would choose the distinct colors, rather than the blended color, as for inclusion into the color table. Additionally, a histogram method may select colors from the color table which differ only slightly from the original colors but which differ from each other in such a way that the blend of the selected colors is significantly different from the blend of the original colors. Again, the reconstructed image actually seen by the human eye will be significantly different than the original image. Thus, while conventional techniques will often yield satisfactory results, they will frequently introduce errors and distortion into the display image.

SUMMARY OF THE INVENTION

The present invention recognizes and addresses various of the foregoing drawbacks, and others, concerning prior art digital display systems. Thus, broadly speaking, it is a principal object of the present invention to provide an improved system for digitally reproducing a color image.

It is a more particular object of the present invention to provide a system and method for optimally reproducing a color display image into a medium which is incapable of simultaneously displaying as many colors as that which may exist in the original image.

It is a further object of the present invention to provide a system and method for digitally reproducing a color image which, in selecting representative colors, accounts for perceptive blending among colors in pixels of the original image.

It is another object of the present invention to provide a system and method for digitally recording and reproducing a color image which, in mapping representative colors to the display image, accounts for the effects of perceptive blending among colors in pixels of the original image.

Additional objects and advantages of the invention are set forth in, or will be apparent to those of ordinary skill in the art from, the detailed description which follows. Also, it should be further appreciated that modifications and variations to the specifically illustrated and discussed features hereof may be practiced in various embodiments and methods of this invention without departing from the spirit and scope thereof, by virtue of present reference thereto. Such variations may include, but are not limited to, substitution of equivalent means and features or devices for those shown and discussed, and the reversal or various parts, features, steps, or the like.

Still further, it is to be understood that different embodiments and methods, as well as different presently preferred embodiments and methods, of this invention may include various combinations or configurations of presently disclosed features or elements, or their equivalents (including combinations or configurations thereof not expressly shown in the figures or stated below). One such exemplary embodiment is directed to a color image reconstruction system usable in producing a second image limited to a number of selected colors from a first image generally having more colors than the second image.

The color image reconstruction system includes first image input means for digitally providing first image data representative of respective colors at a multiplicity of individual pixels in the first image. Input buffer means in operative communication with the first image input means are also provided to temporarily store the first image data. Image quantization means operatively communicate with the input buffer means to receive the first image data and determine the selected colors to be included in the second image. Further, the image quantization means determine which of such selected colors respectively correspond to individual pixels of the second image. Second image output means operatively communicate with the image quantization means for digitally outputting second image data representative of respective colors in the individual pixels of the second image. Frequently, such second image data will include color data representative of the selected colors and index data representative of an index to a respective of the selected colors for each pixel in the second image.

The image quantization means of the present invention will often provide a significant improvement over the prior art in the degree to which the second image will appear like the first image. This is accomplished by selectively accounting for the perceptive blending of different colors in the first image based on the respective pixel locations in which the such different colors appear. In presently preferred embodiments, the color image reconstruction system may account for color blending in the color selection function, the color mapping function or both. These functions will generally be realized using a selected image quantization algorithm implemented by an appropriate processor.

The color image reconstruction system may also include display means for displaying the second image. Such display means will typically include display buffer means for temporarily storing the index data and color table means for temporarily storing the color data. Generally, each index will be in the form of an m-bit digital word capable of addressing $2^m$ colors stored in the lookup table means. Each of the colors will generally be defined by an n-bit digital word, wherein n is greater than m. Often, the n-bit digital words defining the selected colors will be divided into bit segments which respectively define relative intensity of a primary color.

An image quantization algorithm utilized for color selection may first define a set of possible colors from which the colors to be included in the color table will be chosen. The set of possible colors will preferably include first colors which are taken directly from the first image. Additionally, however, the set of possible colors may include second colors which represent the perceptive blending of at least two different colors which appear in adjacent pixels in the original image greater than a preselected number of times. Preferably, the second colors are defined based on a predetermined selection criteria which first seeks to represent a respective second color using an appropriate one of the first colors. If an appropriate first color does not exist, however, and the two different colors appear in adjacent pixels a relatively large number of times, then a perceptive average of the two different colors is included in the color set as a second color. In this manner, the number of total colors in the color set may be kept lower than would otherwise be the case.

Next, individual colors in the set of possible colors are weighted based on the desirability of including each in the color table. Preferably, such weighting may represent the desirability of using that color to represent itself and the desirability of using that color to represent the average of two other colors which appear in adjacent pixels in the original image. Next, respective pairs of colors in the set of possible colors are also selectively weighted. Preferably, this weighting represents the desirability of including one color of such pair, but not the other, in the color table.

After appropriate weighting of the colors in the set of possible colors, a predetermined selection function may then be optimized to select the color table entries. Next, a predetermined mapping function may then be optimized to relate the color table entries to the individual pixels of the second image. Preferably, the predetermined mapping function will selectively determine which color table entries should be displayed in pixels of the second image to approximate the perceptive blending of respective colors in corresponding pixels of the first image.

In presently preferred embodiments, the predetermined selection function and the predetermined mapping function are each energy functions which are optimized by energy reduction. As used herein, the terms "optimize" or "optimization" are not intended to imply the absolute best, or "global" optimum solution, but merely a solution which is acceptable for the stated purposes. Preferably, the predetermined selection function is optimized utilizing a Hopfield neural network, or simulation thereof, which has a computational energy substantially equivalent to the energy function to be optimized. The predetermined mapping function may be optimized by simulating a Markov chain, the steady state of which will produce an acceptable optimization.

It will be appreciated from the disclosure herein that the subject invention addresses further methods of producing a second image limited to a selected number of colors from a first image generally having a greater number of colors. Typically, such methods selectively account for the perceptive blending of colors appearing in the first image based at least in part on the respective locations of the individual pixels of the first image in which such different colors appear. The invention also concerns separate systems or functions as may be contributory to the disclosed overall systems and methods.

Those of ordinary skill in the art will better appreciate the features and aspects of the methods and embodied systems described above, and others, upon review of the remainder of the specification.

BRIEF DESCRIPTION OF THE DRAWINGS

A full and enabling disclosure of the present invention, including the best mode thereof, directed to one of ordinary skill in the art, is set forth in the remainder of the specification, including reference to the accompanying figures, in which:

FIGS. 1A and 1B are diagrammatic representations of first and second original images having identical histograms which may be accurately depicted according to the present invention;

FIGS. 3A and 3B form a flowchart showing the various steps of one exemplary presently preferred method for producing a reconstructed image having a fewer number of colors from an original image having a greater number of colors.

Figure 2:
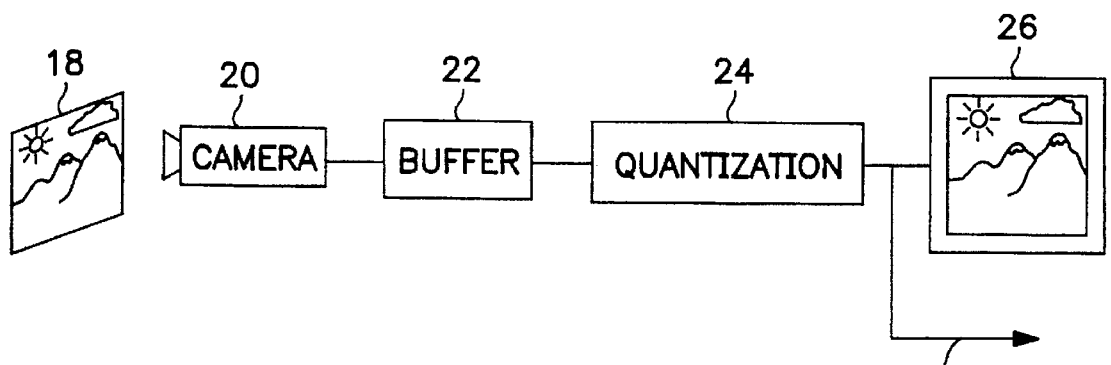
FIG. 2 is a block diagram of a presently preferred embodiment of a color image reconstruction system in accordance with the present invention.

Repeat use of reference characters throughout the present specification and accompanying figures is intended to represent the same or analogous features or elements of the invention.

DETAILED DESCRIPTION OF PREFERRED EMBODIMENTS

Reference will now be made in detail to the presently preferred embodiments of the invention, examples of which are illustrated in the accompanying drawings. Such examples are provided by way of explanation of the invention, and are not intended as limitations thereof. In fact, it will be apparent to those skilled in the art that modifications and variations can be made without departing from the scope or spirit of the present invention. For instance, it will be recognized by those skilled in the art that the particular mathematical equations described may be modified to achieve image-specific goals while still relying upon the spatial relationship (context) of the colors in the images. Additionally, for ease of explanation, the color data processed by the system and method of the present invention may be defined in terms of a three-dimensional color space, typically Red-Green-Blue (RGB) space. It should be understood, however, that the present invention is not limited to space defined by primary colors and therefore has application involving other schemes of color definition. Thus, it is intended that the present invention cover such modifications and variations.

As discussed above, the present invention is concerned with the digital recordation and reproduction of color images. Conventional systems have often produced poor display images because of a reliance upon color quantization methods primarily concerned with the histogram of colors appearing in the original image. That is, in color selection and color mapping, conventional systems have relied on methods which primarily base their decisions only upon the number of occurrences of a color in the original image. The context in which such colors appear with respect to other colors has generally not been a consideration. This has created a problem because color images are divided into pixels, one color per pixel, which are so small that the human eye cannot normally perceive the respective colors in individual pixels. Instead, the eye integrates the various colors in a region of pixels to perceive a blended color. Thus, many colors in an overall region may appear to the eye as a single color.

As an example, consider the original image 10 shown in FIG. 1A. As shown in the left rendering, image 10 contains an equal number of green and blue pixels, and twice that many red pixels. The red and blue pixels are arranged in a "checkerboard" fashion in the bottom half of image 10. This is most easily understood with reference to the eight pixels shown enlarged at 12. Similarly, red and green pixels are arranged in a "checkerboard" pattern in the top half of image 10.

Now consider original image 14 shown in FIG. 1B. Like image 10, the left rendering of image 14 shows that it also has an equal number of green and blue pixels, and twice that many red pixels. In this case, however, the red pixels are all disposed in the top half. As can be seen most clearly with reference to the eight pixels shown enlarged at 16, the green and blue pixels are situated in a checkerboard arrangement in the bottom half of image 14.

The manner in which images 10 and 12 will be perceived by the human eye is respectively illustrated in the right renderings of FIGS. 1A and 1B. The top portion of image 10 will be seen as yellow, due to perceptive blending of red and green. The bottom half, however, will be seen as magenta, due to the perceptive blending of red and blue. Similarly, the top half of image 14 will be faithfully perceived as red, whereas the eye will see cyan in the bottom portion due to the perceptive blending of green and blue.

Suppose that these images are to be reproduced using a color table which can contain a maximum of two colors. In this "simple" color quantization problem, a decision must be made as to which two colors should represent three colors which appear equally often in two different original images. Conventional color quantization techniques would make this decision in varying ways, but histogram-based techniques would be unable to distinguish between images 10 and 14 and so would make the same decision for both. A recent attempt by Balasubramanian & Allebach in the *Journal of Imaging Technology* (1991) to include information regarding adjacent pixels would also fail here because it does not include a model for the perceptive blending of colors. As a result, it would select red and cyan for both image 10 and image 14.

On the other hand, presently preferred embodiments of the present invention would accurately reproduce both image 10 and image 14. This is based, at least partially, on a recognition that the goal should be to reproduce a color image in a manner as actually seen by the eye. The colors appearing in the original image, upon which prior art techniques depend so heavily, are only relevant to this issue to the extent that their context allows. Thus, although red, blue and green are all prevalent in image 10, none of these colors will actually appear to the eye. Therefore, preferred embodiments of the present invention will not choose any of these colors for the color table, but will instead choose magenta and yellow. Similarly, red and cyan are preferably chosen for the color table to reproduce image 14. Thus, by considering pixel colors in the context of their surrounding colors, the present invention often permits a more accurate reproduction of a color image to be achieved. In other words, the present invention accounts for the "perceptive blending" of colors appearing in the original image. As used herein, the term "perceptive blending" will therefore refer to a situation in which at least two colors appearing in respective locations in the original image may be represented in a display image by a single color appearing in both such locations, or by two different colors which may or may not be the original two colors.

A preferred embodiment of the present invention is outlined generally in FIG. 2. In this case, an image 18 is recorded by camera 20 as a multiplicity of pixels. Each pixel contains a single color which may or may not be duplicated elsewhere in image 18. The colors in image 18 are each represented by an n-bit digital word. The input data representative of the respective color at each of the multiplicity of pixels are then input to an input buffer 22 for temporary storage. Next, the data stored in buffer is provided to image quantization means 24, which produces data necessary to generate a reconstructed image on monitor 26. This data may also be output for storage, transmission, or further processing as shown at output line 28. While the input data is shown in this example as being produced by camera 20, it should be understood that the teachings of the present invention are equally applicable to digital image data provided by other sources. For example, such data may be generated by a computer or read from a storage device into which such data has been embedded.

As explained above, monitor 26 will generally be of the type which is incapable of simultaneously displaying as many different colors as may be present in image 18. Instead, a selected number of colors, each represented by an n-bit digital word, are stored in a lookup table which is addressed by an m-bit index. Only these colors may be displayed on monitor 26 at any one time. Typically, n may be equal to twenty-four (24) and m may be equal to eight (8).

Figure 2A:
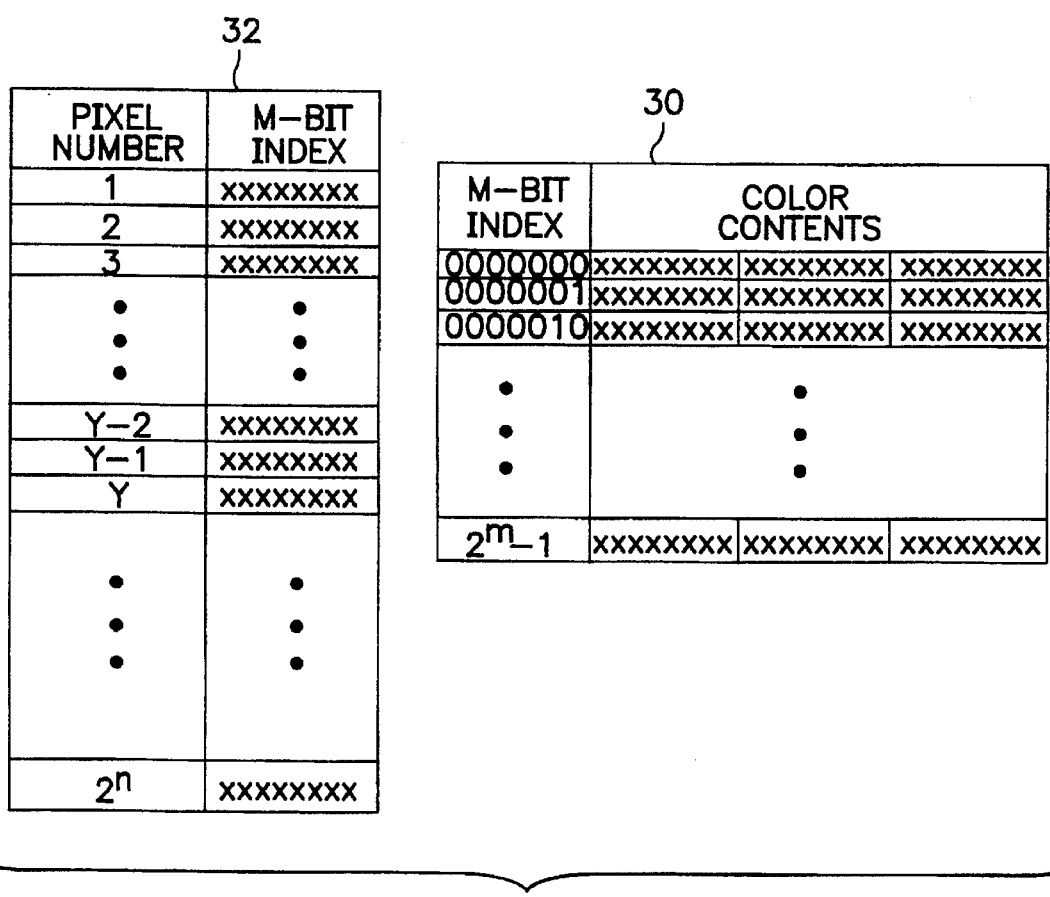
FIG. 2A is a diagrammatic representation of a color table storing a limited number of selected colors for display in a reconstructed image and a display buffer storing index data indicating which of the selected colors correspond to individual pixels of the reconstructed image.

The operation of monitor 26 can be most easily understood with reference to FIG. 2A. The colors which may be displayed at any one time are stored in color table 30. As shown, color table 30 contains $2^m$ memory locations which are indexed by respective addresses "zero" to "$2^m-1$." The color data stored at each memory location is divided into three bit fields, which represent the relative intensity of each primary color making up the overall color stored at the particular location.

Monitor 26 also includes a display buffer 32, which has a number of memory locations corresponding to the pixels in the image to be displayed. For example, assuming that the display image has total of $2^n$ pixels, display buffer 32 will generally have this same number of memory locations. An index value addressing the color within color table 30 to be displayed at a respective pixel is stored within the corresponding memory location in display buffer 32.

To provide the color data for color table 30 and the index data for display buffer 32, image quantization means 24 performs the functions of color selection and color mapping as described generally above. Unlike the prior art, however, image quantization means 24 accounts for the perceptive blending of colors appearing in image 18 in at least one of these two broad functions. As such, the image displayed by monitor 26 will appear generally much closer to image 18 than an image produced by prior art techniques. In fact, it may be often be difficult to visually distinguish between the original and reconstructed images. Therefore, presently preferred embodiments of the invention will facilitate picture quality close to that attainable with many colors utilizing a much smaller number of colors. Costs associated with storing and "transporting" a greater number of colors may be thus avoided without significantly affecting the quality of the image as actually seen.

A preferred methodology of reconstructing an image having a fewer number of colors from an original image having a greater number of colors will be explained with reference to FIGS. 3A and 3B. First, as shown at 34, the digital data representative of image 18 is recorded by appropriate means, such as camera 20. Next, as shown at 36, the image data is temporarily stored, such as by input buffer 22. The digital data is then processed, such as by an appropriate processor within image quantization means 24, to produce digital data representative of the second image. Preferred color selection steps are generally indicated at 38 (i.e, blocks 56 through 74), whereas preferred color mapping steps are generally indicated at 40 (i.e., blocks 86 through 90).

After color mapping, the data may be further processed as desired. For example, as indicated at 42, a decision may be made as to whether the data should be stored. If so, it may be stored as indicated at 44. Additionally, as indicated at 46, a decision may be made as to whether the data should be transmitted. If so, the data may be transmitted, as shown at 48. Finally, as indicated at 50, a decision may be made as to whether the data should be utilized to display the image. The image, such as the image displayed by monitor 26, may then be displayed as indicated at 52. The functional end of the process is given at 54.

A presently preferred methodology for performing the color selection steps collectively referenced as 38 will now be explained. According to this methodology, color selection may be thought of as a problem of labeling the vertices of a connected graph in RGB space. The vertices of this graph will be points which represent the colors to be considered for possible inclusion in color table 30. The vertex set therefore represents the "set of possible colors," denoted as set $S_1$.

As shown at 56, each n-bit number representing a distinct and different color is first included into set $S_1$. Next, additional colors which represent the perceptive blending of at least two different colors in the original image are identified for inclusion into set $S_1$. The color included in set $S_1$ will be deemed to represent the perceptive blending of the two colors.

Next, as shown at 60, a "perceptive average" is determined for each color pair identified at 58. To determine this "perceptive average," a model of spatial color integration is employed. As described above, in many color monitors, the respective intensities of each primary color X=R,G,B making up an overall color are defined by a bit field of m bits. In this case, the available intensities in each such primary may be expressed in the form:

$$\text{INTENSITY}_x = r_x^j, j = 0, 1, \ldots, 2^m - 1, \qquad (1)$$

where $I_x$ is the minimum displayable intensity of the respective primary color and $r_x = (1/I_x)^{1/(2\exp(m)-1))}$ ("2exp(m)-1" representing "$2^m-1$"). The perceptive average of two n bit colors (where n=3m) $i=(i_R, i_G, i_B)$ and $j=(j_R, j_G, j_B)$ may then be defined as the color $k=(k_R, k_G, k_B)$ for which each primary component $k_x$ is given by:

$$k_x = \text{ROUND}\left[\frac{\ln\left(\frac{r_x^{i_x} + r_x^{j_x}}{2}\right)}{\ln(r_x)}\right] \quad X = R, G, B. \qquad (2)$$

If k=average(i,j), then a pixel region of constant color k is perceptively close to an identical region containing an alternating pattern of colors i and j.

After the perceptive average is calculated, as shown at 62, the algorithm first searches for a color already in set $S_1$ which is the calculated average. If no such color is located, the exact average k will be added to set $S_1$, as shown at 66.

As shown at 68, a check is then made to determine whether the last relevant color pair has been analyzed. If not, the sequence of steps is repeated for the next pair beginning at 60. If so, the algorithm proceeds to the step indicated at 70. In this step, the algorithm determines which vertices of the graph are to be connected. In this regard, an edge may be defined between two colors i and j if they appear in adjacent pixels of the original image at least once. If a color k was used to represent the average of two colors i and j, an edge will also exist between i and k and between j and k.

After the graph has been constructed, a predetermined selection function is defined for the image, as shown at 72. Then, as shown at 74, an optimization may be performed on this selection to determine the colors within set $S_1$ to be included in the color table. The derivation of a preferred selection function and subsequent optimization thereof will now be described in detail.

In defining the selection function, it is helpful to regard a set $T_1$={color not selected, color selected}={0,1} as a set of labels to be attached to the elements of set $S_1$ (i.e., the vertices) so that an element $\omega \in T_1^{|S_1|}$ is a vector of labels, one label per vertex. Thus, for each color in set $S_1$, a term (or "label") $\omega_i$ of vector $\omega$ will be "0" if the color is not to be included in the color table and "1" if the color is to be so included. In a situation in which the reconstructed image may have no greater than $2^m$ colors, vector $\omega$ will have at most $2^m$ labels equal to "1." For ease of explanation, it will be assumed that the number of colors in the color table will equal $2^m$. Therefore, the number of possible label vectors will be equal to the number of possible combinations of $2^m$ colors from the total number of colors in set $S_1$. Each of such possible combinations represents a color table under consideration.

If $\rho(S_1)$ denotes the power set (i.e., the set of all possible subsets) of set $S_1$, then a potential on $S_1$ is a real-valued map which may be expressed as follows:

$$U: \rho(S_1) \times T_1^{|S_1|} \to R \qquad (3)$$

such that:
1. $U(\emptyset, \omega) = 0$
2. $U(A, \omega) = U(A, \omega')$ whenever label vectors $\omega$ and $\omega'$ agree on subset A.

The energy of the potential is then given by the following:

$$U(\omega) = \sum_A U(A, \omega). \qquad (4)$$

Similarly, the Gibbs measure induced by U is the probability measure induced on the set $T^{|S_1|}$ of possible label vectors, and is given by the following:

$$P(\omega) = \frac{e^{-U(\omega)}}{M_1} \qquad (5)$$

where $M_1$ is a normalizing constant. The measure (5) induces, by restriction, a measure on the set of legal color tables, i.e., the set of $\omega$ having $2^m$ "1" labels.

An important reason for consideration of these measures is their relationship to entropy. Among measures that have the same expected energy, $E[U(\omega)] = \Sigma_\omega P(\omega) U(\omega)$, the Gibbs measure maximizes the entropy, $-\Sigma_\omega P(\omega) \log P(\omega)$. This connection to entropy is significant because, among a class of measures, a maximum entropy measure may be regarded as the measure of minimal assumption. If nothing is known about what constitutes a "good" color table, each of the color tables under consideration would be regarded as equally desirable. If, however, certain additional knowledge is admitted, that partial knowledge can be used to restrict the class of measures under consideration.

In presently preferred embodiments, this additional knowledge may take the form three assumptions regarding the potential value on subsets A of set $S_1$. First, for each distinct color i in set $S_1$, a first tag function may be defined as follows: $U(\{i\},\omega)=(1-2\omega_i)f(i)$. Second, for each pair of colors i and j in $S_t$ between which an edge exists as indicated at 74, a second tag function may be defined as follows: $U(\{i,j\},\omega)=(1-2\omega_i)(1-2\omega_j)g(i,j)$. For all other subsets A, the summand $U(A,\omega)$ will be set to zero.

The term f(i) is a weight applied to the color i representing of the desirability of using color i to represent itself and/or to represent the perceptive average of two other colors which appear adjacently in the original image. As the term f(i) becomes larger, optimization will tend the label $\omega_i$ toward "1," i.e., color i will be selected. In presently preferred embodiments, this weighting may be expressed as follows:

$$f(i) = \iota(i) + (1/4) \sum_{\{\{k,j\}\subset S | \text{average}(k,j)=i\}} (\alpha(k,j)) \quad (6)$$

where: l(i) is the number of occurrences of color i in the original image; k and j are colors which, when averaged, equal color i; and $\alpha(k,j)$ is the number of instances in which k and j appear in adjacent pixels. The first summand provides for direct use of color i to represent itself. The second balances the first in a perceptive integration role.

The term g(i,j) is preferably a symmetric function specifying the relative desirability of treating colors i and j differently (select one but do not select the other). As g(i,j) becomes larger, optimization will tend the labels $\omega_i$ and $\omega_j$ toward opposite parity. To define a preferred form for g(i,j), let $\kappa(i,j)$ denote that color which, when averaged with i yields j, whenever such color exists as an element of set $S_1$ (e.g., $\kappa$(red, magenta)=blue). In accordance with the model of perceptive blending given above, this can be expressed as:

$$\kappa(i,j)x = \text{ROUND}\left[\frac{\ln\left(\frac{2 j_x^{i_x} - i_x^{i_x}}{2}\right)}{\ln(r_X)}\right] \quad X = R, G, B. \quad (7)$$

In this case, the weighting g(i,j) may then given by:

$$g(i,j)=\alpha(i,j)(1-\delta(i,j))+\alpha(i,\kappa(i,j))\delta(i,\kappa(i,j))+\alpha(j,\kappa(j,i))\delta(j,\kappa(j,i)) \quad (8)$$

where $\delta()$ represents the distance between the given colors in the LUV metric as described in Foley, VanDam, Feiner & Hughes, *Computer Graphics* (2d ed.). If $\kappa(i,j)$ or $\kappa(j,i)$ is not an element of set $S_1$, the corresponding summand does not appear in g(i,j).

It can be seen that g(i,j) represents goals similar to those of f(i). The first summand of g(i,j) considers direct representation, i.e., whether to include treat colors i and j oppositely. In other words, if two colors are close ($\delta(i,j)$ is small) and appear in adjacent pixel positions relatively often ($\alpha(i,j)$ is large), then only one should be chosen.

The second and third summands of g(i,j) symmetrically consider the integration role. If the second color is the average of the first color with another color (or vice versa) and the two colors yielding this average appear frequently in adjacent pixels, the average color is preferably treated oppositely from the two colors combining to form the average. For example, in a checkerboard pattern of red and blue, either magenta or both red and blue would preferably be chosen. It would not be desirable to select all three colors or some other combination of the three.

Normalization may be utilized to balance the relative contributions of the f(i) and g(i,j) terms. In this regard, for any color i, the maximum pairwise contribution is $\Sigma_j|g(i,j)|$. So to scale f(i) to the same range, each f(i) may be divided by max $\{f(i)|i\in S_1\}$ and then multiplied by $\Sigma_j|g(i,j)|$.

Now that the class of measures has been restricted utilizing the additional knowledge as set forth above, such measures may be optimized to determine the colors to be included in the color table. This may be accomplished by selecting the label vector $\omega$ in which $P(\omega)$ is a maximum or, equivalently, in which $U(\omega)$ is a minimum. One method of obtaining such a label vector $\omega$ would be to simply calculate $U(\omega)$ for all label possible label vectors and compare the results. Because of the relatively large number of possible label vectors, however, it will generally be desirable to utilize a special mechanism for this purpose.

Figure 4:
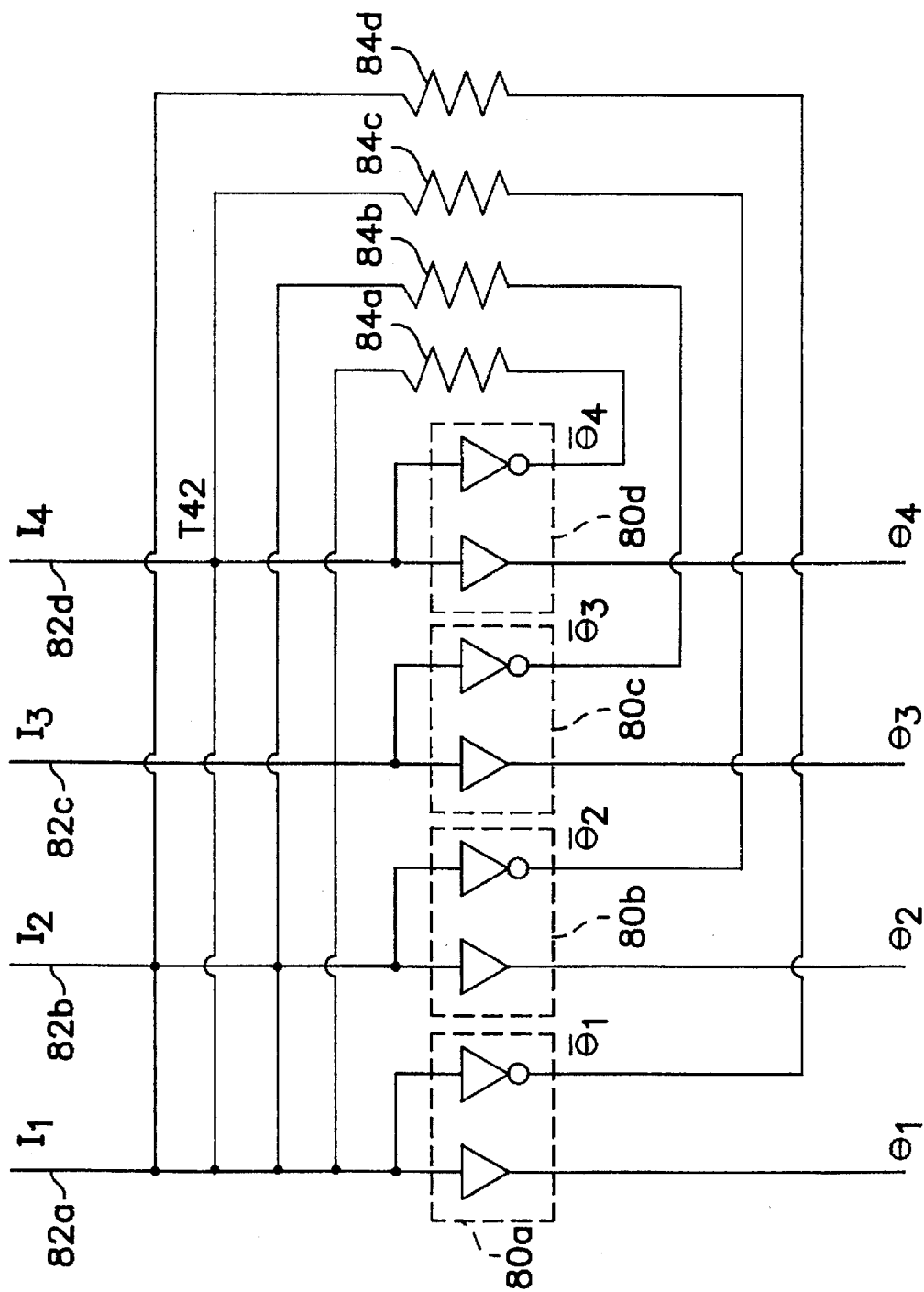
FIG. 4 is schematic diagram of an exemplary four-element Hopfield neural network illustrative of the type (with many more elements) which may be utilized in accordance with the present invention.

One such mechanism is a feedback-connected neural network referred to as the Hopfield neural network. A four-element Hopfield neural network is diagrammatically illustrated for purposes of explanation in FIG. 4. The individual neurons of the network are represented by respective amplifiers 80a, 80b, 80c and 80d, each providing both standard and inverted outputs (voltage $\theta_i \in [-1,1]$). Synapses are represented by the physical connections between input lines 82a, 82b, 82c and 82d to the respective amplifiers 80a–d, and the feedback lines from amplifiers 80a–d. Resistors 84a, 84b, 84c and 84d are used to make these feedback connections. If the input to amplifier i is connected to the output of amplifier j by a resistor with value $R_{ij}$, then the conductance of the connection is $T_{ij}$. The magnitude of this conductance is $1/R_{ij}$ and the sign thereof is determined by whether the respective connection is made to the standard or inverted output.

It is known that when the conductance matrix (having elements $T_{ij}$) of a Hopfield neural network is symmetric with zero diagonal, and the amplifiers are operated in "high-gain" mode, the stable states of the network output are binary ($\{-1,1\}$) and are the local minima of a computational energy given by: where N is the total number of external inputs $I_i$ to the amplifiers. The energy function $U(\omega)$ given above $$E(\theta) = (-1/2)\sum_{i=0}^{(N-1)}\sum_{j=0}^{(N-1)} T_{ij}\theta_i\theta_j - \sum_{i=0}^{N-1}\theta_i I_i \quad (9)$$

may be written in the form of the Hopfield computational energy. Specifically, the following assignments may be made to produce function $U(\omega)$ from function $E(\theta)$:

$$T_{ij} = T_{ji} = \begin{cases} \dfrac{-U(\{i,j\},\omega)}{(1-2\omega_i)(1-2\omega_j)} & i,j \text{ neighbors, } i\neq j \\ 0 & \text{otherwise} \end{cases} \quad (10)$$

$$I_i = \frac{U(\{i\},\omega)}{(1-2\omega_i)} \quad (11)$$

$$\theta_i = (2\omega_i - 1). \quad (12)$$

Note that Equation (10) will be equal to $-g(i,j)$ when i and j are neighbors. Thus, $R_{ij}=R_{ji}=1/g(i,j)$ in this case. It can be seen with reference to Equation (11) that the input $I_i$ will be equal to f(i). Using these assignments, a Hopfield network having a number of amplifiers equal to the number of colors in set $S_1$ would be able to locate local minima of function $U(\omega)$. Such local minima represent those color tables with high probability assignment in the Gibbs measure.

The realization of such a network as hardware would be very desirable because of the speed at which the inherent parallel nature thereof would permit the local minima of function $U(\omega)$ to be located. Currently, however, networks of such size are not believed to be commercially available. As such, the preferred embodiment implements a software simulation of the Hopfield neural network. This simulation is performed by appropriate processing hardware within image quantization means 24.

Traditionally, network simulation to obtain a local minimum of a network energy function has been approached as a numerical integration of N differential equations describing the operation of the of the amplifiers:

$$C_i du_i/dt = \sum_j T_{ij} g(u_j) - u_i/R_i + I_i \qquad (13)$$

where: $C_i$ is the input capacitance to amplifier i; $u_i$ is the internal input voltage to amplifier i, which is related to the desired output voltage $\theta_i$ by a sigmoidal gain function g(x); and $R_i=1/(1/\rho+\Sigma_j|T_{ij}|)$, where $\rho$ is amplifier input resistance. A reasonable choice for g(x) is a scaled hyperbolic tangent, $g(x)=\tanh(\lambda x)$, where $\lambda$ is referred to as the gain.

To reduce the time required to find a solution for the N differential equations by numerical integration, an alternative approach may be employed. The Hopfield neural network will be in a stable state when it is in equilibrium, that is, when $$0 = \sum_j T_{ij} g(u_i) - u_i/R_i + I_i. \qquad (14)$$

This can be rewritten in the following form:

$$u_i = R_i \left( \sum_j T_{ij} g(u_j) + I_i \right) \qquad (15)$$

or, more simply, $$u = G(u), \qquad (16)$$

where $G(u)=\text{diag}(R)(Tg(u)+I)$. The term diag(R) has $R_i$'s on the diagonal and 0's elsewhere, and $g(u)=(g(u_1), g(u_2), \ldots, g(u_n))$. Thus, a fixed point of a certain N-dimensional function is sought. The following iteration scheme is known to be useful in locating such a fixed point:

$$u^{k+1} = \frac{1}{\lambda+1} G(u^k) + \frac{\lambda}{\lambda+1} u^k \qquad (17)$$

Once G(u) has converged, the color table is defined by selecting each color i corresponding to the $2^m$ highest $u_i$ values.

After the color table has been selected, the colors are mapped to individual pixels of the reconstructed image. As stated above, such color mapping will also preferably account for the perceptive blending effect of colors appearing in the original image. Therefore, in presently preferred embodiments, the selected colors of the color table will be mapped to individual pixels of the reconstructed image by selectively determining which colors thereof approximate the perceptive average of corresponding pixels in the original image.

Figure 3B:
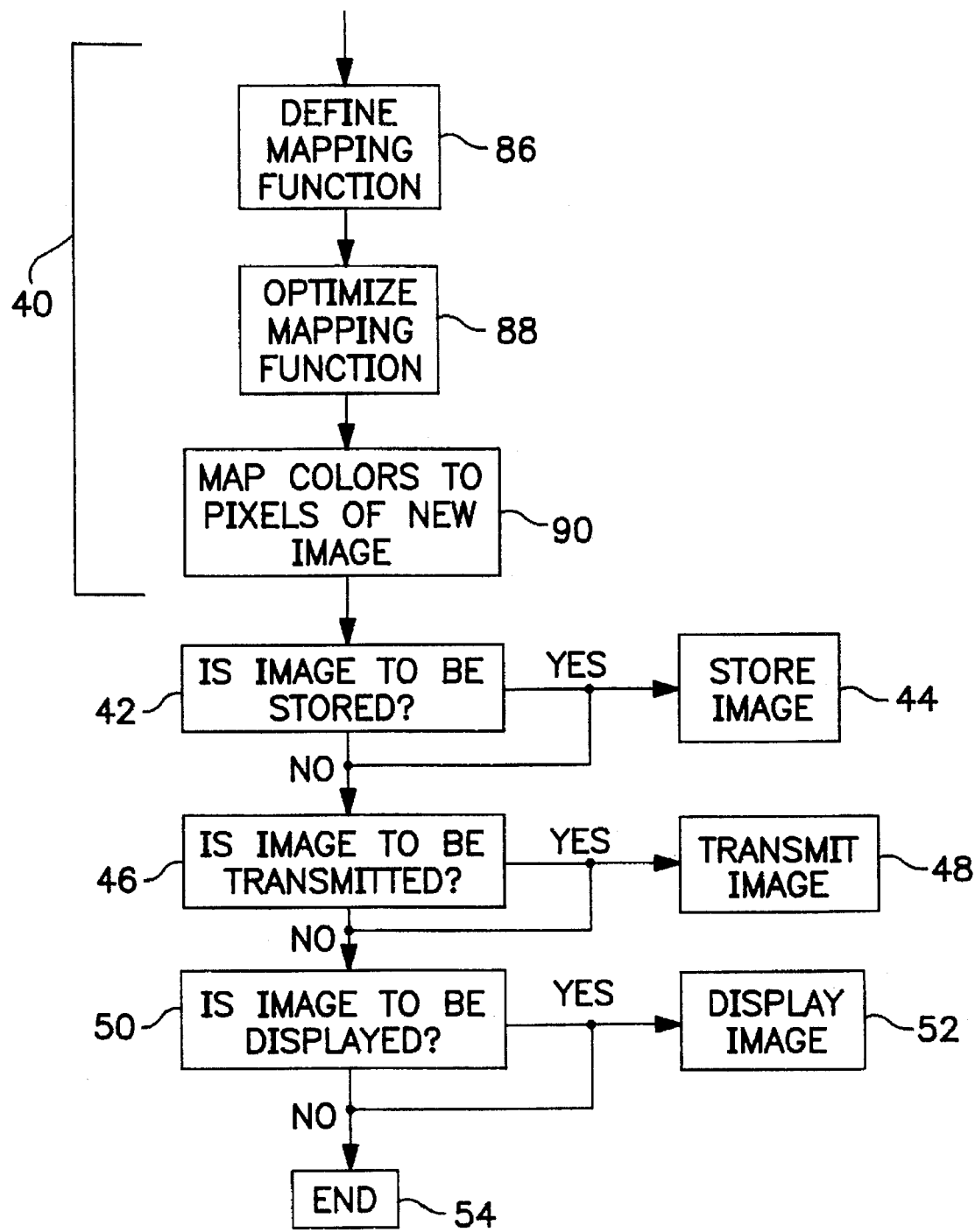

Referring now particularly to FIG. 3B, preferred color mapping steps are collectively referenced as 40. First, as indicated at 86, a predetermined mapping function is defined for the original image and the given color table. Next, as shown at 88, an optimization is performed on the mapping function. Finally, as indicated at 90, the results of the optimization are utilized to generate the appropriate index data. The derivation of a preferred mapping function and subsequent optimization thereof will now be described in detail.

The dithering technique discussed above with respect to the prior art median cut quantization algorithm incorporates adjacency information during mapping in a strictly serial, asymmetric fashion. The present invention, on the other hand, provides parallel, symmetric treatment by utilizing a connected graph technique similar in some respects to that employed for color table selection. In this case, however, the vertices of the graph are the possible pairings of a particular pixel with a particular entry in the color table. In other words, vertex set $S_2=\{(p,c)|p \in \text{pixels}, c \in \text{color table}\}$. Edges are defined to exist from any vertex (p,c) to all vertices (p',c'), where p' is a pixel which is adjacent to p in the image. The label set in this case may then be denoted as set $T_2=\{\text{do not assign c to p, assign c to p}\}$ having as elements label vectors $\Omega \in T_2^{|S_2|}$.

An appropriate energy function may be expressed in this case as $U(\Omega)=\Sigma_{B \subset S_2} U(B,\Omega)$ and the associated Gibbs measure will be given by $P(\Omega)=e^{-U(\Omega)}/M_2$. Each term of the energy function $U(\Omega)$ is, in this case, given by the following expression:

$$U(\{(p,c),(p',c')\},\Omega)=$$

$$\Omega_{(p,c)}\Omega_{(p',c')} \text{wt}(p,p')\delta(\text{average}(V_p,V_{p'}),\text{average}(c,c')), \qquad (18)$$

whenever vertices (p,c) and (p',c') are connected by an edge in the graph. The terms $V_p$ and $V_{p'}$ denote the n-bit definition of the colors respectively disposed at p and p' in the original image. The term wt(p,p') is a weighting factor which gives greater emphasis to the more noticeable horizontal pixel color transitions. Suitable values for this weighting factor are given below:

$$\text{wt}(p,p') = \begin{cases} 3/8 & \text{if } p \text{ and } p' \text{ are horizontally adjacent} \\ 3/32 & \text{if } p \text{ and } p' \text{ are vertically adjacent} \\ 1/64 & \text{if } p \text{ and } p' \text{ are diagonally adjacent} \end{cases}$$

Thus, for a given vertex (p,c) there will be a term $U(B,\Omega)$ for each of the adjacent pixels (generally eight), such term being respectively weighted by wt(p,p'). Additionally, the value of each such term will be proportional to the distance in the LUV metric between the perceptive average of the colors in the original image and the perceptive average of the two colors proposed for the corresponding pixels in the reconstructed image. For all other subsets B of the set $S_2$, $U(B,\Omega)$ is set to zero.

The Gibbs measure restricted to the set of legal assignments, i.e., $L=\{\Omega \in T_2^{|S_2|}|\Sigma_{c \in \text{color table}}\Omega_{(p,c)}=1\}$, may then be taken as a measure of the quality of mappings. Similarly to color selection, the optimization performed for color mapping seeks that $\Omega \in L$ with a maximum $P(\Omega)$ or, equivalently, a minimum $U(\Omega)$. As such, energy reduction will tend to make both labels $\Omega_{(p,c)}$ and $\Omega_{(p',c')}$ become "0" as the distance $\delta(\text{average}(V_p,V_{p'}),\text{average}(c,c'))$ increases. Thus, a color will tend to be mapped to a given pixel such that, when averaged with its adjacent colors, produces the same color as, or a similar color to, the average color over the corresponding pixels in the original image.

The energy function $U(\Omega)$ is of the form which can, at least conceptually, be optimized utilizing a Hopfield neural network. It should be appreciated, however, that set $S_2$ will generally be much larger than set $S_1$. As such, a Hopfield neural network to optimize function $U(\Omega)$ would generally need to have a correspondingly greater storage capacity.

Therefore, presently preferred embodiments of the invention employ an alternative approach for this purpose. Specifically, each $\Omega \in T_2^{|S_2|}$ may be regarded as a state in a finite Markov chain. Transitions are allowed in the chain from any state $\Omega$ to another state $\Omega^{\delta(p,c)}$ that differs from $\Omega$ in one component, (p,c). The transition probabilities may then be given by:

$$Q(\Omega,\Omega^{\delta(p,c)}) = \frac{1}{|S_2|} e^{min\{0, U(\Omega) - U(\Omega^{\delta(p,c)})\}} \quad (21)$$

An important observation about this Markov chain is the following:

$$\begin{aligned} P(\Omega)Q(\Omega,\Omega^{\delta(p,c)}) &= (1/|S_2|)e^{min\{0,U(\Omega)-U(\Omega^{\delta(p,c)})\}}e^{-U(\Omega)}/M_2 \quad (22) \\ &= (1/|S_2|)e^{min\{-U(\Omega),-U(\Omega^{\delta(p,c)})\}}/M_2 \\ &= (1/|S_2|)e^{min\{0,U(\Omega^{\delta(p,c)})-U(\Omega)\}}e^{-U(\Omega^{\delta(p,c)})}/M_2 \\ &= P(\Omega^{\delta(p,c)})Q(\Omega^{\delta(p,c)},\Omega). \end{aligned}$$

This condition indicates that the Gibbs measure $P(\Omega)$ is the steady-state (invariant measure) of this chain. Thus, an alternative approach to selecting a label vector $\Omega$ with a high $P(\Omega)$ is simulation of this chain. In other words, starting with a given $\Omega$, an assignment (p,c) is selected at random and is changed with probability $e^{min\{0,U(\Omega)-U(\Omega \exp \delta(p,c))\}}$ ("$\Omega \exp \delta$ (p,c)" representing "$\Omega^{\delta(p,c)}$"). In the steady state, a label vector $\Omega$ should emerge having a frequency $P(\Omega)$. Thus, desirable assignments are more likely to appear than undesirable ones.

In presently preferred embodiments, convergence of this Markov simulation is hastened by adding a scale factor K>1 to $U(\Omega)$. Such a scale factor decreases the probability of accepting an increase in $U(\Omega)$. If the scale factor K is increased in stages, the Markov simulation becomes a simulated annealing procedure in which the steady-state is the desired measure, $P(\Omega)$.

Storage difficulties in the annealing procedure may be reduced by constraint to the set of legal assignments, L. For each pixel p, only that color table entry c is stored for which $\Omega_{(p,c)}$ is equal to "1." If element (p,c) is selected for change, another c' in the color table is selected and replaces c (effectively $\Omega_{(p,c)}=0$ and $\Omega_{(p,c')}=1$ if the change in $U(\Omega)$ so warrants.

Once convergence of the Markov chain is achieved, an optimum vector $\Omega$ will be derived having terms $\Omega_{(p,c)}=1$ for each pair (p,c) which will be utilized to produce the reconstructed image. As shown in FIG. 3B, the image data thus produced is then output by image quantization means 24 for further processing as discussed above.

In presently preferred embodiments, the perceptive blending of colors in the original image is taken into account for both of the color selection and color mapping functions. It is to be distinctly understood, however, that these functions may be mutually exclusive. In such situations, either color selection or color mapping may take perceptive blending of colors into account, with the other function performed utilizing conventional techniques.

While presently preferred embodiments of the invention, and presently preferred methods of practicing the same, have been described and shown, it will be understood by those of ordinary skill in the art that the present invention is not limited thereto since many modifications can be made. Many such modifications and variations have been mentioned above. It is to be distinctly understood, however, that methodology other than the exemplary algorithm may be employed while retaining reliance upon the spatial relationship, or context, among colors in pixels of the original image. Therefore, it is contemplated by the present application to cover any and all such modifications and variations that may fall within the literal or equivalent scope of the appended claims.

What is claimed is:

1. A color image quantization system useable in producing a second image limited to a number of selected colors from a first image generally having a number of colors greater than the number of the selected colors, said color image reconstruction system comprising:

first image input means for digitally providing first image data representative of respective colors at a multiplicity of individual pixels in the first image;

input buffer means in operative communication with said first image input means for temporarily storing the first image data;

image quantization means in operative communication with said input buffer means for receiving the first image data and determining the selected colors to be included in the second image, said image quantization means further determining which of the selected colors respectively correspond to individual pixels of the second image;

said image quantization means further operative at least in part to selectively account for perceptive blending of at least two different colors appearing in the first image in determining the selected colors to be included in the second image, based at least in part on respective locations of the individual pixels of the first image in which the two different colors appear;

wherein said image quantization means includes Hopfield neural network means for determining the selected colors to be included in the second image; and second image output means in operative communication with said image quantization means for digitally outputting second image data representative of respective colors in the individual pixels of the second image.

2. A color image reconstruction system useable in producing a second image limited to a number of selected colors from a first image generally having a number of colors greater than the number of the selected colors, said color image reconstruction system comprising:.

first image input means for digitally providing first image data representative of respective colors at a multiplicity of individual pixels in the first image;

input buffer means in operative communication with said first image input means for temporarily storing the first image data;

image quantization means in operative communication with said input buffer means for receiving the first image data and determining the selected colors to be included in the second image, said image quantization means further determining which of the selected colors respectively correspond to individual pixels of the second image;

said image quantization means further operative at least in part to selectively account for perceptive blending of at least two different colors appearing in the first image based at least in part on respective locations of the individual pixels of the first image in which the two different colors appear;

said image quantization means being operative to implement an image quantization algorithm comprising the steps of:

(a) defining a set of possible colors including first colors in the first image and colors representing the perceptive blending of at least two different colors which appear in adjacent pixels in the first image;

(b) selectively weighting respective colors in the set of possible colors;

(c) selectively weighting a multiplicity of respective pairs of colors in the set of possible colors, the multiplicity of respective pairs of colors in the set of possible colors being selectively weighted according to a substantially symmetric relationship tending to selectively favor one color of each pair over another of the pair based at least in part on the similarity of individual colors of the pair;

(d) determining a table of the selected colors from said set of possible colors based on an optimization of a predetermined selection function; and (e) mapping colors from the table of the selected colors to the individual pixels of the second image; and second image output means in operative communication with said image quantization means for digitally outputting second image data representative of respective colors in the individual pixels of the second image.

3. A color image reconstruction system as in claim 2, wherein respective colors in the set of possible colors are selectively weighted in step (b) based on the prevalence of the respective color and the prevalence of two colors for which the respective color is substantially a perceptive average thereof.

4. A color image reconstruction system useable in producing a second image limited to a number of selected colors from a first image generally having a number of colors greater than the number of the selected colors, said color image reconstruction system comprising:

first image input means for digitally providing first image data representative of respective colors at a multiplicity of individual pixels in the first image;

input buffer means in operative communication with said first image input means for temporarily storing the first image data;

image quantization means in operative communication with said input buffer means for receiving the first image data and determining the selected colors to be included in the second image, said image quantization means further determining which of the selected colors respectively correspond to individual pixels of the second image;

said image quantization means further operative at least in part to selectively account for perceptive blending of at least two different colors appearing in the first image based at least in part on respective locations of the individual pixels of the first image in which the two different colors appear;

said image quantization means being operative to implement an image quantization algorithm comprising the steps of:

(a) defining a set of possible colors including first colors in the first image and colors representing the perceptive blending of at least two different colors which appear in adjacent pixels in the first image;

(b) selectively weighting respective colors in the set of possible colors;

(c) selectively weighting a multiplicity of respective pairs of colors in the set of possible colors;

(d) determining a table of the selected colors from said set of possible colors based on an optimization of a predetermined selection function; and (e) mapping colors from the table of the selected colors to the individual pixels of the second image;

said image quantization means further including Hopfield neural network means for implementing the optimization of the predetermined selection function; and second image output means in operative communication with said image quantization means for digitally outputting second image data representative of respective colors in the individual pixels of the second image.

5. A color image reconstruction system as in claim 4, wherein said Hopfield neural network means is a Hopfield neural network having a number of elements substantially equal to the number of colors present in the set of possible colors.

6. A color image reconstruction system as in claim 4, wherein said Hopfield neural network means is operative to simulate operation of a Hopfield neural network by iteratively finding an equilibrium of a number of differential equations describing the operation of elements of a Hopfield neural network.

7. A color image reconstruction system useable in producing a second image limited to a number of selected colors from a first image generally having a number of colors greater than the number of the selected colors, said color image reconstruction system comprising:

first image input means for digitally providing first image data representative of respective colors at a multiplicity of individual pixels in the first image;

input buffer means in operative communication with said first image input means for temporarily storing the first image data;

image quantization means in operative communication with said input buffer means for receiving the first image data and determining the selected colors to be included in the second image, said image quantization means further determining which of the selected colors respectively correspond to individual pixels of the second image;

said image quantization means further operative at least in part to selectively account for perceptive blending of at least two different colors appearing in the first image based at least in part on respective locations of the individual pixels of the first image in which the two different colors appear;

said image quantization means being operative to implement an image quantization algorithm comprising the steps of:

(a) defining a set of possible colors including first colors in the first image and colors representing the perceptive blending of at least two different colors which appear in adjacent pixels in the first image;

(b) selectively weighting respective colors in the set of possible colors;

(c) selectively weighting a multiplicity of respective pairs of colors in the set of possible colors;

(d) determining a table of the selected colors from said set of possible colors based on an optimization of a predetermined selection function; and (e) mapping colors from the table of the selected colors to the individual pixels of the second image based on an optimization of a predetermined mapping function; and second image output means in operative communication with said image quantization means for digitally outputting second image data representative of respective colors in the individual pixels of the second image.

8. A color image reconstruction system as in claim 7, wherein the predetermined mapping function compares an average of possible pairs of colors in the table of the selected colors to an average of the colors contained in a first individual pixel of the first image and respective second individual pixels of the first image which are adjacent to the first individual pixel.

9. A color image reconstruction system as in claim 8, wherein the predetermined mapping function is weighted by a factor which is dependent upon the spatial relationship between adjacent individual pixels in the second image.

10. A color image reconstruction system as in claim 9, wherein a spatial relationship of horizontal adjacency is weighted more heavily than a spatial relationship of vertical adjacency which is weighted more heavily than a spatial relationship of diagonal adjacency due to a corresponding order in the noticeability of color transitions.

11. A method of producing a second image limited to a number of selected colors from a first image generally having a number of colors greater than the number of the selected colors, said method comprising the steps of:

(a) reading digital data representative of respective colors at a multiplicity of individual pixels of the first image;

(b) determining the selected colors to be included in the second image based on the respective colors at the multiplicity of individual pixels of the first image;

(c) determining which of the selected colors respectively correspond to individual pixels of the second image;

(d) determining the selected colors respectively corresponding to the individual pixels of the second image in step (c) by selectively determining which colors of the selected colors should respectively correspond to adjacent pixels of the second image to substantially approximate the perceptive blending of respective colors in corresponding pixels of the first image;

(e) wherein steps (b), (c) and (d) collectively include the following steps:

(f) defining a color set of possible colors including first colors in the first image and second colors representing the perceptive blending of two different colors which appear in adjacent pixels in the first image;

(g) defining a first tag function for respective colors in the color set, said first tag function weighted according to prevalence of occurrence of the respective color in the first image and by a measure indicative of a desirability of utilizing the respective color to replace two other colors occurring adjacently in the first image;

(h) defining a second tag function for selected pairs of colors in the color set, said second tag function weighted to facilitate choosing of only one color of each selected pair of colors as colors of the respective selected pair become more similar and further weighted according to prevalence of adjacent occurrence of one color of each selected pair and another color in the first image which average to another color of each selected pair;

(i) determining a table of the selected colors from possible combinations of colors within the color set based on an optimization of a selection function defined as a sum of the first and second tag functions, wherein the optimization of the selection function is performed in step (i) by employing a Hopfield neural network; and (j) mapping colors from the table of the selected colors to individual pixels of the second image by selectively determining which colors of the selected colors should respectively correspond to adjacent of the individual pixels in the second image to approximate the perceptive blending of respective colors in corresponding pixels in the first image; and (k) digitally outputting second image data representative of the respective colors in the individual pixels of the second image.

12. A method as in claim 11, wherein said Hopfield neural network is a simulated Hopfield neural network operative to perform by iteratively finding an equilibrium of a number of differential equations describing the operation of elements of a Hopfield neural network.

* * * * *